United States Patent
Liu et al.

(10) Patent No.: US 12,437,031 B2
(45) Date of Patent: Oct. 7, 2025

(54) METHOD OF HOP COUNT MATRIX RECOVERY BASED ON DECISION TREE CLASSIFIER

(71) Applicant: Sun Yat-sen University, Guangzhou (CN)

(72) Inventors: Xingcheng Liu, Guangzhou (CN); Yingying Zhao, Guangzhou (CN); Yitong Liu, Guangzhou (CN)

(73) Assignee: Sun Yat-sen University, Guangzhou (CN)

(*) Notice: Subject to any disclaimer, the term of this patent is extended or adjusted under 35 U.S.C. 154(b) by 882 days.

(21) Appl. No.: 17/566,732

(22) Filed: Dec. 31, 2021

(65) Prior Publication Data
US 2022/0292318 A1    Sep. 15, 2022

(30) Foreign Application Priority Data
Mar. 15, 2021    (CN) .......................... 202110278022.4

(51) Int. Cl.
*G06F 18/245*    (2023.01)
*G06F 18/2132*   (2023.01)
(Continued)

(52) U.S. Cl.
CPC ...... *G06F 18/245* (2023.01); *G06F 18/21322* (2023.01); *G06F 18/2411* (2023.01); *G06F 18/24323* (2023.01); *H04W 64/006* (2013.01)

(58) Field of Classification Search
USPC ...................................................... 370/351
See application file for complete search history.

(56) References Cited

U.S. PATENT DOCUMENTS 10,073,907 B2    9/2018 Cardno et al.
10,546,237 B2    1/2020 Heifets et al.
(Continued)

FOREIGN PATENT DOCUMENTS

CN    112115988 A  * 12/2020    ............. B62D 11/00

OTHER PUBLICATIONS

Yingying Zhao et al, Recovery of Hop Count Matrices for the Sensing Nodes in Internet of Things, Feb. 24, 2020, IEEE, p. 5128-5139 (Year: 2020).*

(Continued)

*Primary Examiner* — Luna Weissberger
(74) *Attorney, Agent, or Firm* — True Shepherd LLC; Andrew C. Cheng (57) ABSTRACT

A method of hop count matrix recovery based on a decision tree classifier, includes: S1: performing a flooding process to acquire a hop count matrix $\tilde{H}$ with missing entries; S2: constructing a training sample set according to relationships between a part of observed hop counts in the hop count matrix $\tilde{H}$, and modeling the observed hop counts in the hop count matrix as labels of the training sample set, wherein a maximum hop count represents a number of classes; S3: training a decision tree classifier according to the training sample set obtained in step S2; and S4: constructing a feature for an unobserved hop count, to obtain an unknown sample; and inputting the unknown sample to the trained decision tree classifier, to obtain a class of the unknown sample which represents a missing hop count at a corresponding position in the matrix, to recover a complete hop count matrix H.

7 Claims, 10 Drawing Sheets

(51) Int. Cl.
*G06F 18/2411* (2023.01)
*G06F 18/243* (2023.01)
*H04W 64/00* (2009.01)

(56) References Cited

U.S. PATENT DOCUMENTS 10,637,744 B2    4/2020  Carroll et al.
2019/0098050 A1*  3/2019  Lumezanu ............ H04L 43/026

OTHER PUBLICATIONS

Yingying Zhao et el. Recovery of Hop Count Matrices for the Sensing Nodes in Internet of Things, Date of publication Feb. 24, 2020 (Year: 2020).*

Yingying Zhao et. al., Recovery of Hop Count Matrices for the Sensing Nodes in Internet of Things, IEEE Internet of Things Journal, Feb. 24, 2020, pp. 5128-5139, vol. 7, Issue 6, IEEE, U.S.A.

* cited by examiner

METHOD OF HOP COUNT MATRIX RECOVERY BASED ON DECISION TREE CLASSIFIER

CROSS-REFERENCE TO RELATED APPLICATIONS

This application claims priority to Chinese Patent Application No. 202110278022.4 with a filing date of Mar. 15, 2021. The content of the aforementioned application, including any intervening amendments thereto, is incorporated herein by reference.

TECHNICAL FIELD

The present disclosure relates to the technical field of wireless sensor networks, and in particular, to a method of hop count matrix recovery based on a decision tree classifier.

BACKGROUND

The Internet of Things (IoT) is widely used in various fields of society and is important for e-medicine, military monitoring, agricultural production, etc. A wireless sensor network, as the basis of the IoT, contains a large number of small and inexpensive sensor nodes. The sensor nodes are randomly distributed in a monitored area, and the core function of the wireless sensor network is to sense and report data. The observed data is meaningful only if the location of the data generation is known. Therefore, acquiring location information of nodes is the first task after node deployment, which plays a crucial role in understanding the application context. As the traditional Global Positioning System (GPS) requires expensive hardware facilities and high energy consumption, a GPS-based positioning method is not suitable for large-scale wireless sensor networks. In addition, the weak indoor positioning capability of the GPS cannot meet various application scenarios of wireless sensor networks.

Currently, localization solutions for wireless sensor networks can be divided into two major categories: range-based localization solution and non-range-based localization solution. In practical scenarios, a hop count matrix for the non-range-based localization solution is easier to obtain than a distance matrix for the range-based localization solution, because the distance measurement is affected by noise, multipath effects, signal fading or shadowing. In the non-range-based localization solution, the sensor nodes record hop count information of themselves and other nodes during the flooding process, and the hop count matrix is constructed after the flooding is finished. Even if the hop count matrix can be obtained by such a simple method, the hop count matrix observed during the implementation may still contain some missing entries.

It is well known that the sensor nodes have limited energy, and some sensors with monitoring tasks even have energy harvesting capabilities. During the flooding process, the nodes need to continuously send and receive data, which requires high energy consumption. Due to the limited energy of some nodes, in many cases, flooding needs to be terminated before the hop count matrix converges and only some of the hop values in the network can be utilized. In addition, attacks from malicious nodes in the monitored area may contaminate the hop count information, and the malicious nodes may disguise themselves as normal nodes to tamper with forwarded information during the flooding process, which will greatly jeopardize the localization of the nodes. Although many existing solutions can be used to detect malicious nodes and exclude contaminated hop counts, they do not recover these missing hop counts. Therefore, in many cases, only an incomplete hop count matrix is obtained. If an incomplete hop count matrix is used for localization, the localization accuracy will be greatly reduced.

In general, if the obtained hop count matrix contains missing entries, flooding is generally performed again to obtain a new hop count matrix, so as to ensure the localization performance. However, the sensor nodes have limited energy, and the high energy consumption of the flooding process in the non-range-based localization solution is a well-known drawback, and this method results in great energy loss. Therefore, how to recover the hop count matrix without affecting the localization performance and avoid the energy loss caused by the second flooding is an urgent problem to be resolved in the non-range-based localization solution.

In the prior art, for example, in a plain Bayesian-based hop count matrix complementation method [Zhao, Y, Liu, X., Han, F., & Han, G. (2020). Recovery of hop count matrices for the sensing nodes in internet of things. IEEE Internet of Things Journal, 7, 5128-5139], hop counts between nodes in the network are learned, a missing hop count is predicted by using a single feature, and a plain Bayesian classifier is used to learn a relationship between hop counts in the matrix and hop counts of a neighboring node.

However, there are still the following deficiencies in the prior art:
1. A missing value in the hop count matrix is determined by constructing a single feature, which has limited ability to discriminate between classes, and therefore the matrix recovery is not effective.
2. Although some of information between nodes contained in the hop count matrix is missing, relationships between different nodes are still observed, and the observed partial information is not well utilized in the prior art.
3. The performance of the hop count matrix recovery method in the prior art is not verified in non-range-based localization, only a recovery error between the recovered hop count matrix and the original hop count matrix is determined through comparison, which cannot prove the significance of the hop count matrix recovery for IoT applications.

SUMMARY

In order to solve the problem of ineffective recovery of missing values in a hop count matrix in the prior art, the present disclosure provides a method of hop count matrix recovery based on a decision tree classifier, which achieves a more accurate prediction result for missing hop counts and greatly improves the recovery capability for the hop count matrix.

To achieve the foregoing objective of the present disclosure, the following technical solution is used: a method of hop count matrix recovery based on a decision tree classifier, including the following steps:

S1: performing a flooding process to acquire a hop count matrix H with missing entries;

S2: constructing a training sample set according to relationships between a part of observed hop counts in the hop count matrix H, and modeling the observed hop counts in the hop count matrix as labels of the training sample set, where a maximum hop count represents a number of classes;

S3: training a decision tree classifier according to the training sample set obtained in step S2; and S4: a feature for an unobserved hop count, to obtain an unknown sample; and inputting the unknown sample to the trained decision tree classifier, to obtain a class of the unknown sample which equals to a missing hop count at a corresponding position in the matrix, so as to recover a complete hop count matrix H.

Preferably, a hop count vector of any node i is constructed: $h_i=\{h_{i1}, h_{i2}, \ldots, h_{in}\}$, $h_{ij}$ represents a hop count between node i and node j, i=1, ..., n; j=1, ..., n; and the hop count matrix H with missing entries is represented by formula (2):

$$\tilde{H} = H \odot \Omega = \begin{bmatrix} 0 & h_{12} \times \omega_{12} & h_{13} \times \omega_{13} & \ldots & h_{1n} \times \omega_{1n} \\ h_{21} \times \omega_{21} & 0 & h_{23} \times \omega_{23} & \ldots & h_{2n} \times \omega_{2n} \\ h_{31} \times \omega_{31} & h_{32} \times \omega_{32} & 0 & \ldots & h_{3n} \times \omega_{3n} \\ \vdots & \vdots & \vdots & \ddots & \vdots \\ h_{n1} \times \omega_{n1} & h_{n2} \times \omega_{n2} & h_{n3} \times \omega_{n3} & \ldots & 0 \end{bmatrix} \quad (2)$$

$$= \begin{bmatrix} 0 & \tilde{h}_{12} & \tilde{h}_{13} & \ldots & \tilde{h}_{1n} \\ \tilde{h}_{21} & 0 & \tilde{h}_{23} & \ldots & \tilde{h}_{2n} \\ \tilde{h}_{31} & \tilde{h}_{32} & 0 & \ldots & \tilde{h}_{3n} \\ \vdots & \vdots & \vdots & \ddots & \vdots \\ \tilde{h}_{n1} & \tilde{h}_{n2} & \tilde{h}_{n3} & \ldots & 0 \end{bmatrix},$$

wherein $\odot$ represents a Hadamard product; $\Omega=[\omega_{ij}]_{n*n}$ is a binary matrix; $\omega_{ij}$ indicates whether a hop count at a corresponding position of the hop count matrix is missing, and is expressed as follows:

$$\omega_{ij} = \begin{cases} 1, & \text{if hop count } h_{ij} \text{ is observed} \\ 0, & \text{other} \end{cases}.$$

Preferably, after step S1 and before step S2, if a symmetric position of a missing hop count is observed, the missing hop count is supplemented by using a hop count at the symmetric position.

Further, step S2 specifically includes:

S201: traversing the hop count matrix $\tilde{H}$, and performing a next step if a hop count at a certain position is observed; otherwise, traversing a next value in the hop count matrix $\tilde{H}$;

S202: using node i and node/to represent two nodes between which a hop count is missing, and with respect to all other nodes k, k=1, 2, ..., n in the network, calculating a minimum hop count sum of a hop count $\tilde{h}_{ik}$ from node i to node k and a hop count $\tilde{h}_{kj}$ from node k to node j, as a first feature of an unknown sample;

S203: calculating an average value of hop counts from neighboring nodes of node i to node j and hop counts from neighboring nodes of node j to node i, as a second feature of the training sample;

S204: using the observed hop count as a class, forming the training sample by using the class together with the first feature and second feature, and adding the training sample to the training sample set; and S205: traversing the entire hop count matrix $\tilde{H}$, and obtaining the training sample set after the traversing is finished.

Further, step S203 specifically includes: initializing two neighbor lists $L_i$ and $L_j$, selecting neighbors of node i according to a hop count vector $\tilde{h}_i$, and selecting neighbors of node j according to a hop count vector $\tilde{h}_j$; storing indexes of neighboring nodes of node i and indexes of neighboring nodes of node j in the corresponding neighbor lists $L_i$ and $L_j$ respectively, where a variable $n_i$ represents the number of available neighboring nodes of node i, and a variable $n_j$ represents a number of available neighboring nodes of node j; and if a hop count $\tilde{h}_{L_i(k)j}$ between a neighboring node $L_i(k)$ and node j is observed, incrementing a number of available neighboring nodes $n_i$ by 1;

wherein the second feature of the training sample is calculated as shown in formula (4)

$$f^2 = \frac{\sum_{k=1,\tilde{h}_{jL_i(k)}\neq 0}^{n_i} \tilde{h}_{jL_i(k)} + \sum_{k=1,\tilde{h}_{iL_j(k)}\neq 0}^{n_j} \tilde{h}_{iL_j(k)}}{n_i + n_j} \quad (4)$$

wherein $f^2$ represents a second feature of the training sample.

Further, the constructed training sample set is expressed as formula (5):

$$S=[s_1,s_2,\ldots,s_N]=[(f_1^1,f_1^2,c_1);(f_2^1,f_2^2,c_2); \ldots (f_N^1, f_N^2,c_N)], \quad (5)$$

wherein $f_m^1$ represents a first feature of an $m^{th}$ training sample, $f_m^2$ represents a second feature of the $m^{th}$ training sample, and $c_m \in \{1, 2, \ldots, h_{max}\}$ represents a class of the $m^{th}$ training sample, m=1, 2, ..., N, and $h_{max}$ is a maximum hop count.

Further, step S4 specifically includes the following substeps:

S401: if the hop count at a certain position in the hop count matrix $\tilde{H}$ is not observed, performing a next step; otherwise, traversing a next value in the hop count matrix $\tilde{H}$;

S402: using node i and node j to represent two nodes between which a hop count is missing, and with respect to all other nodes k, k=1, 2, ..., n in the network, calculating a minimum sum of a hop count $\tilde{h}_{ik}$ from node i to node k and a hop count $\tilde{h}_{kj}$ from node k to node j, as a first feature of the unknown sample;

S403: calculating an average value of hop counts from neighboring nodes of node i to node j and hop counts from neighboring nodes of node j to node i, as a second feature of the unknown sample;

S404: forming the unknown sample by using the constructed first feature and second feature of the unknown sample, inputting the unknown sample to the trained decision tree classifier to obtain the class of the unknown sample, that is, obtain the hop count at the position; and S405: if traversing of the hop count matrix $\tilde{H}$ is not finished, traversing a next value in the matrix and returning to step S401; and if traversing of the hop count matrix $\tilde{H}$ is finished, obtaining the recovered hop count matrix.

Further, the constructed training sample set is expressed following:

$$\left(\min(\tilde{h}_{ik}+\tilde{h}_{kj}), \frac{\sum_{k=1,\tilde{h}_{jL_i(k)}\neq 0}^{n_i} \tilde{h}_{jL_i(k)} + \sum_{k=1,\tilde{h}_{iL_j(k)}\neq 0}^{n_j} \tilde{h}_{iL_j(k)}}{n_i + n_j}\right),$$

wherein $\min(\tilde{h}_{ik}+\tilde{h}_{kj})$ represents a minimum sum of a hop count $\tilde{h}_{ik}$ from node i to node k and a hop count $\tilde{h}_{kj}$ from node k to node j.

A computer device is provided, including a memory, a processor, and a computer program stored in the memory and executable on the processor, where the processor implements the steps of the foregoing method when executing the computer program.

A computer-readable storage medium storing a computer program is provided, where the steps of the foregoing method are implemented when the computer program is executed by a processor.

The present disclosure has the following beneficial effects.

The present disclosure makes full use of observed information in a hop count matrix with missing entries, multi-dimensional features are constructed, and prediction results of missing hop counts are more accurate based on the joint analysis of the multi-dimensional features, thereby greatly improving the recovery capability for the hop count matrix.

DETAILED DESCRIPTION OF THE EMBODIMENTS

The present disclosure is described in detail below with reference to the accompanying drawings and embodiments.

Embodiment 1

Figure 1:
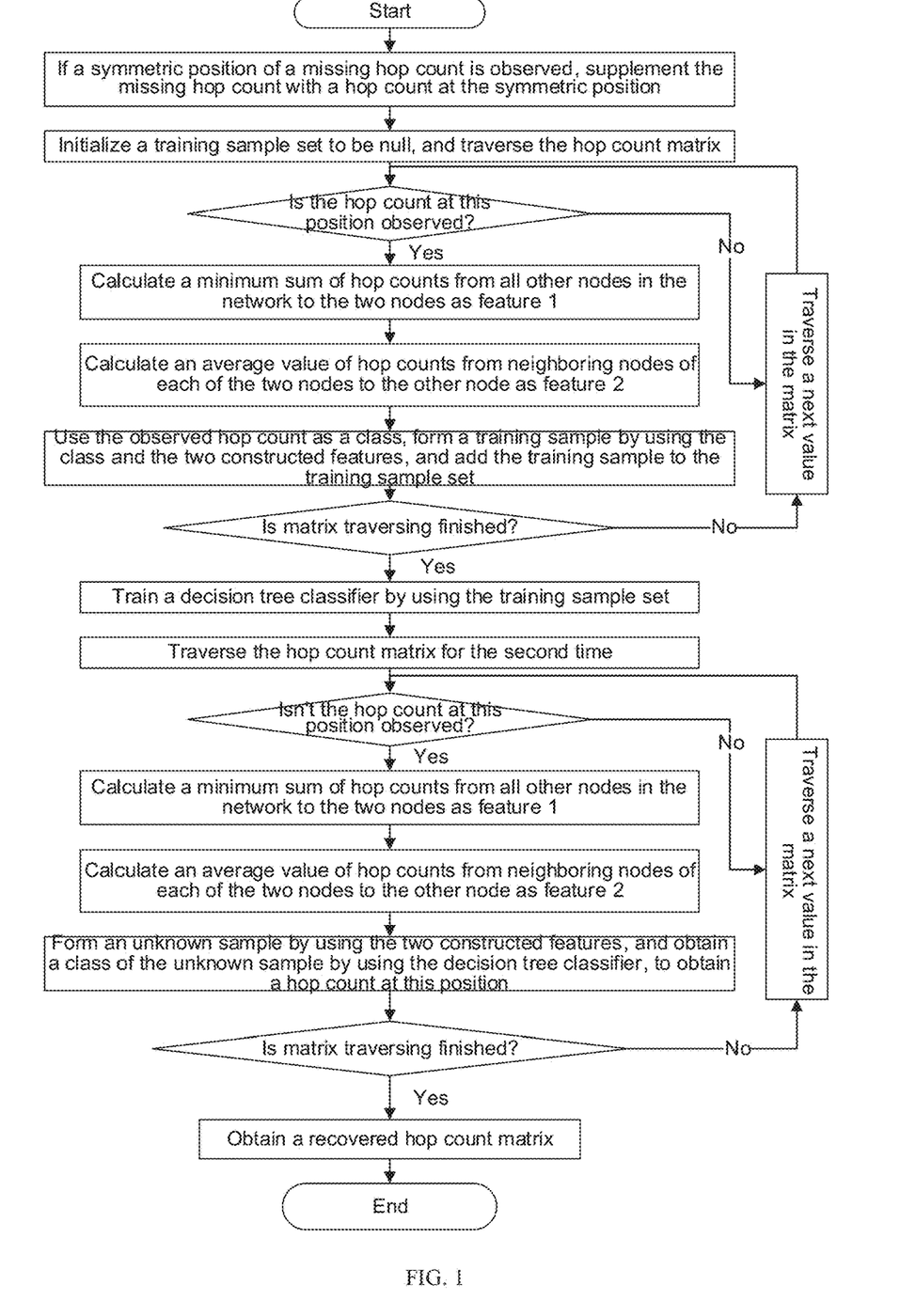
FIG. 1 is a flowchart of a method in Embodiment 1.

As shown in FIG. 1, a method of hop count matrix recovery based on a decision tree classifier includes the following steps:

S1: Perform a flooding process to acquire a hop count matrix $\tilde{H}$ with missing entries.

S2: Construct a training sample set according to relationships between a part of observed hop counts in the hop count matrix $\tilde{H}$, and model the observed hop counts in the hop count matrix as labels of the training sample set, where a maximum hop count represents the number of classes.

S3: Train a decision tree classifier according to the training sample set obtained in step S2.

S4: Construct a feature for an unobserved hop count, to obtain an unknown sample; and inputting the unknown sample to the trained decision tree classifier, to obtain a class of the unknown sample which equals to a missing hop count at a corresponding position in the matrix, so as to recover a complete hop count matrix H.

Figure 2:
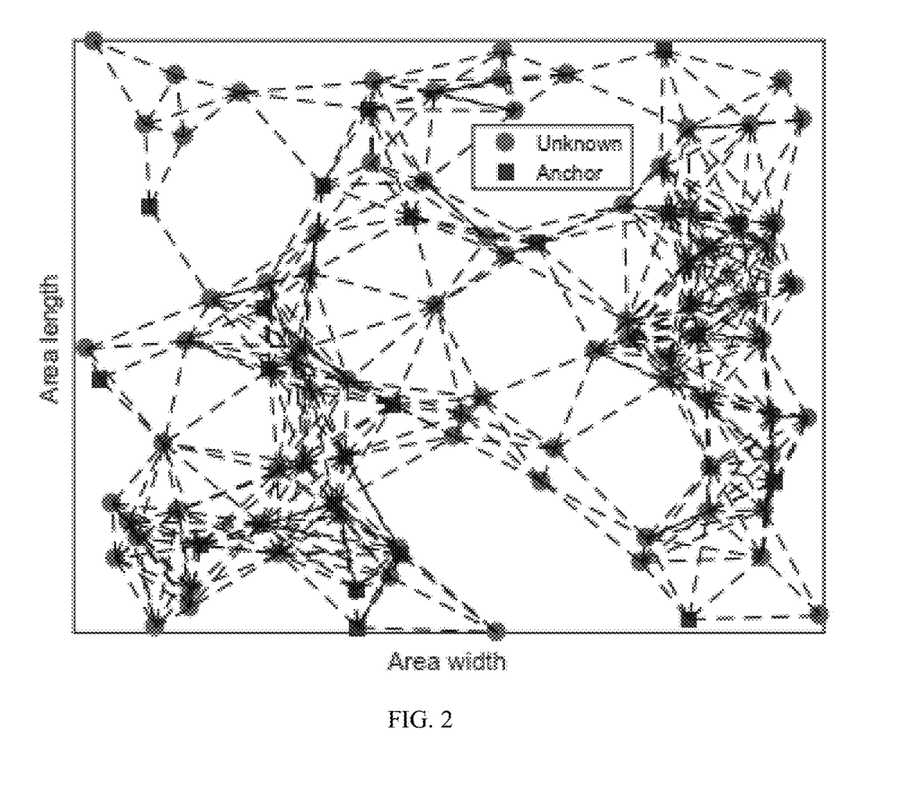
FIG. 2 shows a network model in Embodiment 1.

In a specific embodiment, as shown in FIG. 2, a network contains n sensor node, where the nodes are randomly deployed in a monitored area, an anchor node is marked with a cube, and an unknown node is marked with a circle. If two nodes can communicate with each other directly, they are connected with a dashed line to represent one hop. All the anchor nodes and sensor nodes are considered to have the same transmission capability, and a transmission radius of each node is represented by R. Each node can directly communicate with other nodes within a circle with the node itself as the center and R as the radius, and communicates with nodes outside the circle in a multi-hop manner.

Through a flooding process, every node in the network can obtain minimum hop counts of other nodes. A hop count vector of any node i is constructed: $h_i=\{h_{i1}, h_{i2}, \ldots, h_{in}\}$, $h_{ij}$ represents a hop count between node i and node j; i=1, ..., n; j=1, ..., n. A hop count matrix is constructed by using hop count vectors of all the nodes, as shown in formula (1):

$$H = [h_1, h_2, \ldots, h_n] = \begin{bmatrix} 0 & h_{12} & h_{13} & \ldots & h_{1n} \\ h_{21} & 0 & h_{23} & \ldots & h_{2n} \\ h_{31} & h_{32} & 0 & \ldots & h_{3n} \\ \vdots & \vdots & \vdots & \ddots & \vdots \\ h_{n1} & h_{n2} & h_{n3} & \ldots & 0 \end{bmatrix} \quad (1)$$

However, in the flooding process, due to node failures or attacks from malicious nodes, some entries in the hop count matrix H are missing, where the hop count matrix with missing entries is expressed as formula (2):

$$\tilde{H} = H \odot \Omega = \begin{bmatrix} 0 & h_{12}\times\omega_{12} & h_{13}\times\omega_{13} & \ldots & h_{1n}\times\omega_{1n} \\ h_{21}\times\omega_{21} & 0 & h_{23}\times\omega_{23} & \ldots & h_{2n}\times\omega_{2n} \\ h_{31}\times\omega_{31} & h_{32}\times\omega_{32} & 0 & \ldots & h_{3n}\times\omega_{3n} \\ \vdots & \vdots & \vdots & \ddots & \vdots \\ h_{n1}\times\omega_{n1} & h_{n2}\times\omega_{n2} & h_{n3}\times\omega_{n3} & \ldots & 0 \end{bmatrix} = \quad (2)$$

$$\begin{bmatrix} 0 & \tilde{h}_{12} & \tilde{h}_{13} & \ldots & \tilde{h}_{1n} \\ \tilde{h}_{21} & 0 & \tilde{h}_{23} & \ldots & \tilde{h}_{2n} \\ \tilde{h}_{31} & \tilde{h}_{32} & 0 & \ldots & \tilde{h}_{3n} \\ \vdots & \vdots & \vdots & \ddots & \vdots \\ \tilde{h}_{n1} & \tilde{h}_{n2} & \tilde{h}_{n3} & \ldots & 0 \end{bmatrix},$$

wherein $\odot$ represents a Hadamard product; $\Omega=[\omega_{ij}]_{n*n}$ is a binary matrix; indicates whether a hop count at a corresponding position of the hop count matrix is missing, and is expressed as follows:

$$\omega_{ij} = \begin{cases} 1, & \text{if hop count } h_{ij} \text{ is observed} \\ 0, & \text{other cases} \end{cases}; i = 1, \ldots, n; j = 1, \ldots, n.$$

The objective of the method in this embodiment is to obtain the original hop count matrix H according to the matrix $\tilde{H}$ with missing entries, to model a recovery problem of the hop count matrix as a classification problem.

In a specific embodiment, after step S1 and before step S2, in order to increase the number of training samples, if a symmetric position of a missing hop count is observed, the missing hop count is supplemented by using a hop count at the symmetric position. That is, if one of the hop count $\tilde{h}_{ij}$ from node i to node j and the hop count $\tilde{h}_{ji}$ from node j to node i is observed, the hop count at the other position is supplemented by the hop count at the symmetric position.

In a specific embodiment, the training sample set is initialized to be null. To construct the training sample set, the hop count matrix needs to be traversed. When the hop count $\tilde{h}_{ij}$ between node i and node j is not equal to 0, it indicates that the hop count between node i and node j is observed, and the hop count is used as a label of a training sample.

In a specific embodiment, for the recovery of the hop count matrix, the only available information is partial observed entries in the incomplete hop count matrix. Therefore, in this embodiment, the training sample set is constructed by using the observed entries, and topological information in the network is used to train the decision tree classifier. The training sample set is constructed by using relationships between hop counts in the network. The hop counts in the hop count matrix are modeled as labels of the training sample set, and a maximum hop count $h_{max}$ in the network represents the number of classes, that is, the hop count in the network is an integer from 1 to $\tilde{h}_{max}$.

Step S2 specifically includes the following sub-steps:

S201: Initialize the training sample set to be null; in order to construct the training sample set, traverse the hop count matrix $\tilde{H}$, and when the hop count $\tilde{h}_{ij}$ between node i and node j is not equal to 0, which indicates that the hop count between node i and node j is observed, use the hop count is used as a label of a training sample, and perform a next step; otherwise, traverse a next value in the hop count matrix $\tilde{H}$.

S202: According to features of the hop count matrix, calculate hop counts of node i and node j with respect to other nodes k in the network, as shown in formula (3):

$$h_{ij} = \min(h_{ik} + h_{kj}), k=1,2,\ldots,n, k\neq i, k\neq j \quad (3)$$

For a hop count matrix without missing entries, when $h_{ij} \neq 1$, $h_{ij} = \min(h_{ik} + h_{kj})$, $k=1, 2, \ldots, n$, $k\neq i$, $k\neq j$. However, for a hop count matrix with missing entries, the relationship between $\tilde{h}_{ij}$ and $\min(\tilde{h}_{ik} + \tilde{h}_{kj})$ is not clear. Therefore, the relationship between the two can be learned through a decision tree classifier.

Therefore, for all other nodes k, k=1, 2, . . . N in the network, if the hop count $\tilde{h}_{ik}$ from node i to node k and the hop count $\tilde{h}_{kj}$ from node k to node j are observed, a sum of the two hop counts is calculated. All the nodes in the network are traversed to obtain a minimum value as a first feature of a training sample:

$$f^1 = \min(\tilde{h}_{ik} + \tilde{h}_{kj}).$$

S203: Due to a limited prediction capability of a single feature, construct neighbor information of a node pair as features, to jointly classify an unknown hop count. The hop count between node i and node j is closely related to hop counts from neighboring nodes of node i to node j and hop counts from neighboring nodes of node j to node i. Because the neighboring nodes are distributed around the node, values of the hop counts from the neighboring nodes of node i to node j can be $[\tilde{h}_{ij}-1, \tilde{h}_{ij}, \tilde{h}_{ij}+1]$. Therefore, when the node distribution is even enough and no neighboring node is missing, the hop count between node i and node j can be obtained by calculating the hop counts from the neighboring nodes of node i to node j. However, the node distribution in the network is not completely even and some neighboring nodes may be missing, their relationship also needs to be learned by using the decision tree classifier. An average value of the hop counts from the neighboring nodes of node i to node j and the hop counts from the neighboring nodes of node j to node i is calculated to serve as a second feature of the training sample.

Specifically, two neighbor lists $L_i$ and $L_j$ are initialized, neighbors of node i are selected according to a hop count vector $\tilde{h}_i$, and neighbors of node j are selected according to a hop count vector $\tilde{h}_j$. Indexes of neighboring nodes of node i are stored in the neighbor list $L_i$, and indexes of neighboring nodes of node j are stored in the neighbor list $L_j$. Variables $n_i$ and $n_j$ respectively represent the numbers of available neighboring nodes of node i and node j. If a hop count $\tilde{h}_{L_i(k)j}$ between a neighboring node $L_i$ (k) and node j is observed, the number of available neighboring nodes $n_i$ is incremented by 1.

The second feature of the training sample is calculated as shown in equation (4):

$$f^2 = \frac{\sum_{k=1, \tilde{h}_{jL_i(k)}\neq 0}^{n_i} \tilde{h}_{jL_i(k)} + \sum_{k=1, \tilde{h}_{iL_j(k)}\neq 0}^{n_j} \tilde{h}_{iL_j(k)}}{n_i + n_j}. \quad (4)$$

S204: Use the observed hop count as a class, and form a training sample by using the class together with the constructed first feature and second feature of the sample, where the training sample is expressed as follows:

$$\left\{\min(\tilde{h}_{ik} + \tilde{h}_{kj}), \frac{\sum_{k=1, \tilde{h}_{jL_i(k)}\neq 0}^{n_i} \tilde{h}_{jL_i(k)} + \sum_{k=1, \tilde{h}_{iL_j(k)}\neq 0}^{n_j} \tilde{h}_{iL_j(k)}}{n_i + n_j}, \tilde{h}_{ij}\right\}.$$

The training sample is added to the training sample set.

S205: Traverse the hop count matrix $\tilde{H}$, and obtain the training sample set after the traversing is finished, where the training sample set is expressed as formula (5):

$$S = [s_1, s_2, \ldots, s_N] = [(f_1^1, f_1^2, c_1); (f_2^1, f_2^2, c_2); \ldots (f_N^1, f_N^2, c_N)], \quad (5)$$

wherein $f_m^1$ represents a first feature of an $m^{th}$ training sample, $f_m^2$ represents a second feature of the $m^{th}$ training sample, and $c_m \in \{1, 2, \ldots, h_{max}\}$ represents a class of the $m^{th}$ training sample; m=1, 2, . . . , N, and N is the number of training samples.

The decision tree classifier is trained by using the obtained training sample set.

In a specific embodiment, a feature is constructed for each unobserved hop count, to obtain unknown samples; and the hop count matrix $\tilde{H}$ is traversed again, to find missing hop counts in the hop count matrix $\tilde{H}$. Specifically:

S401: If a hop count at a certain position in the hop count matrix $\tilde{H}$ is not observed, perform a next step; otherwise, traverse a next value in the hop count matrix $\tilde{H}$.

S402: For each missing hop count, construct a first feature of an unknown samples, and with respect to all other nodes k, k=1, 2, . . . N in the network, if a hop count $\tilde{h}_{ik}$ from node i to node k and a hop count $\tilde{h}_{kj}$ from node k to node j are observed, calculate a sum of the two hop counts. All the nodes in the network are traversed to obtain a minimum value as a first feature of the unknown sample:

$$f'^1 = \min(\tilde{h}_{ik} + \tilde{h}_{kj}). \quad (5)$$

S403: Initialize two neighbor lists $L_i$ and $L_j$, select neighbors of node i according to a hop count vector $\tilde{h}_i$, and select neighbors of node j according to a hop count vector $\tilde{h}_j$. Indexes of neighboring nodes of node i and indexes of neighboring nodes of node j are stored in the neighbor lists $L_i$ and $L_j$ respectively. Variables $n_i$ and $n_j$ respectively represent the numbers of available neighboring nodes of node i and node j. If a hop count $\tilde{h}_{L_i(k)j}$ between a neighboring node $L_i(k)$ and node j is observed, the number of available neighboring nodes $n_i$ is incremented by 1. Then, an average value of hop counts from neighboring nodes of node i to node j and hop counts from neighboring nodes of node j to node i is calculated to construct a second feature of the unknown sample, as shown in equation (6):

$$f'^2 = \frac{\sum_{k=1, \tilde{h}_{jL_i(k)} \neq 0}^{n_i} \tilde{h}_{jL_i(k)} + \sum_{k=1, \tilde{h}_{iL_j(k)} \neq 0}^{n_j} \tilde{h}_{iL_j(k)}}{n_i + n_j} \quad (6)$$

S404: Form an unknown sample by using the constructed first feature and second feature of the unknown sample, where the unknown sample is expressed as follows:

$$\left( \min(\tilde{h}_{ik} + \tilde{h}_{kj}), \frac{\sum_{k=1, \tilde{h}_{jL_i(k)} \neq 0}^{n_i} \tilde{h}_{jL_i(k)} + \sum_{k=1, \tilde{h}_{iL_j(k)} \neq 0}^{n_j} \tilde{h}_{iL_j(k)}}{n_i + n_j} \right).$$

The unknown sample is inputted to the trained decision tree classifier to obtain a class of the unknown sample, that is, obtain the hop count at the position.

S405: If traversing of the hop count matrix $\tilde{H}$ is not finished, traverse a next value in the matrix and return to step S401; and if traversing of the hop count matrix $\tilde{H}$ is finished, obtain the recovered hop count matrix.

In this embodiment, features are constructed for all missing values in the hop count matrix $\tilde{H}$, and then are classified by using the decision tree classifier, to obtain the hop count at each position with the missing value, thereby obtaining the recovered complete hop count matrix.

An application scenario of this embodiment is described below, to reflect the advantage of the method in this embodiment over other methods. However, various parameters in the experiments are not set fixedly. The performance of this embodiment is compared with the performance of a method of hop count matrix recovery based on naive Bayes classifier (HCMR-NBC) and the performance of a singular value thresholding (SVT) method. For ease of description, the contrast solutions and the method of hop count matrix recovery based on decision tree (HCMR-DT) in this embodiment are all denoted by abbreviations in the figures. Normalized root mean square errors (NRMSEs) of the recovered hop count matrix $\overline{H}$ and the original hop count matrix H are used as one of the indicators for measuring the algorithm performance, where the formula of the NRMSE is as follows:

$$NRMSE = \frac{\|H - \overline{H}\|_F}{\|H\|_F} = \sqrt{\frac{\sum_{i=1}^{n}\sum_{j=1}^{n}(h_{ij} - \overline{h}_{ij})^2}{\sum_{i=1}^{n}\sum_{j=1}^{n} h_{ij}^2}} \quad (7)$$

A 100×100 square monitored area containing 20 anchor nodes is considered, where the nodes are randomly distributed in the monitored area. The communication radii of the anchor nodes and unknown nodes are set to 20. In the experiments, effects of observation ratio, matrix dimension (obtained by varying the node density) and network topology (specifically, uniform network, O-type network and S-type network) on the performance of the algorithm were considered. In addition, to reduce random errors, all the experiments were repeated 100 times to obtain final results.

Figure 3:
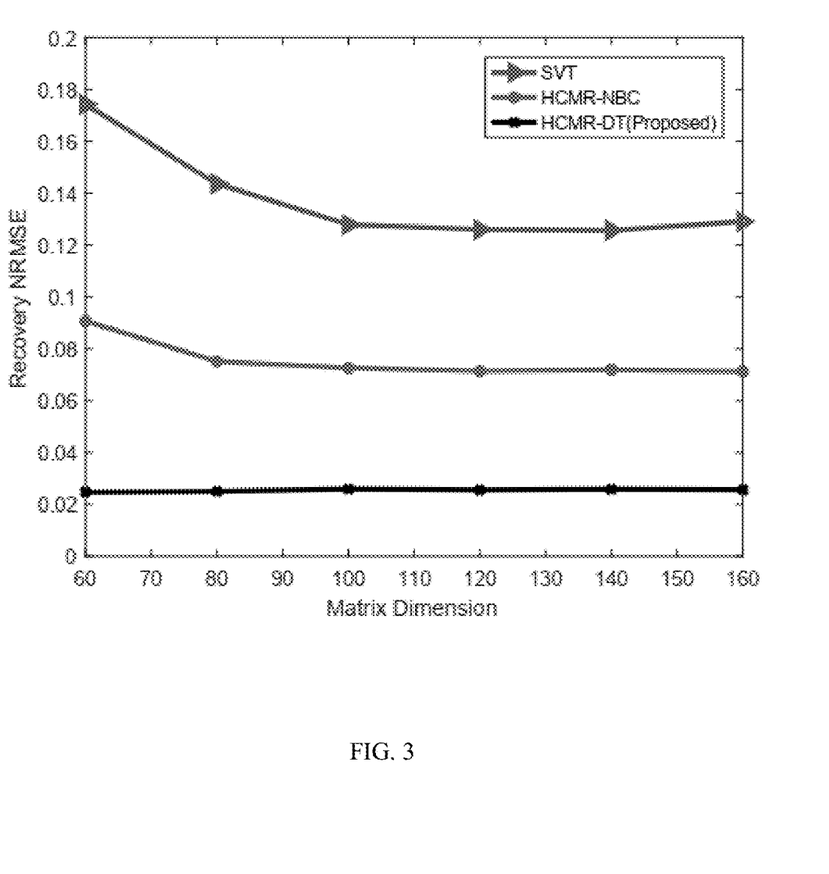
FIG. 3 shows reconstruction errors of an algorithm at different matrix dimensions according to Embodiment 1.

Effects of different matrix dimensions on the reconstruction performance of the algorithm were first compared experimentally. FIG. 3 show NRMSE curves of hop count matrix reconstruction at different matrix dimensions.

As can be learned from FIG. 3, compared with the algorithm SVT and the algorithm HCMR-NBC, the method proposed in this embodiment maintains an obvious performance advantage regardless of the observation ratios and matrix dimensions, because compared with the existing solutions, this embodiment makes full use of observed information in a hop count matrix with missing entries, multi-dimensional features are constructed, and prediction results of missing hop counts are more accurate based on the joint analysis of the multi-dimensional features, thereby greatly improving the recovery capability for the hop count matrix.

Figure 4:
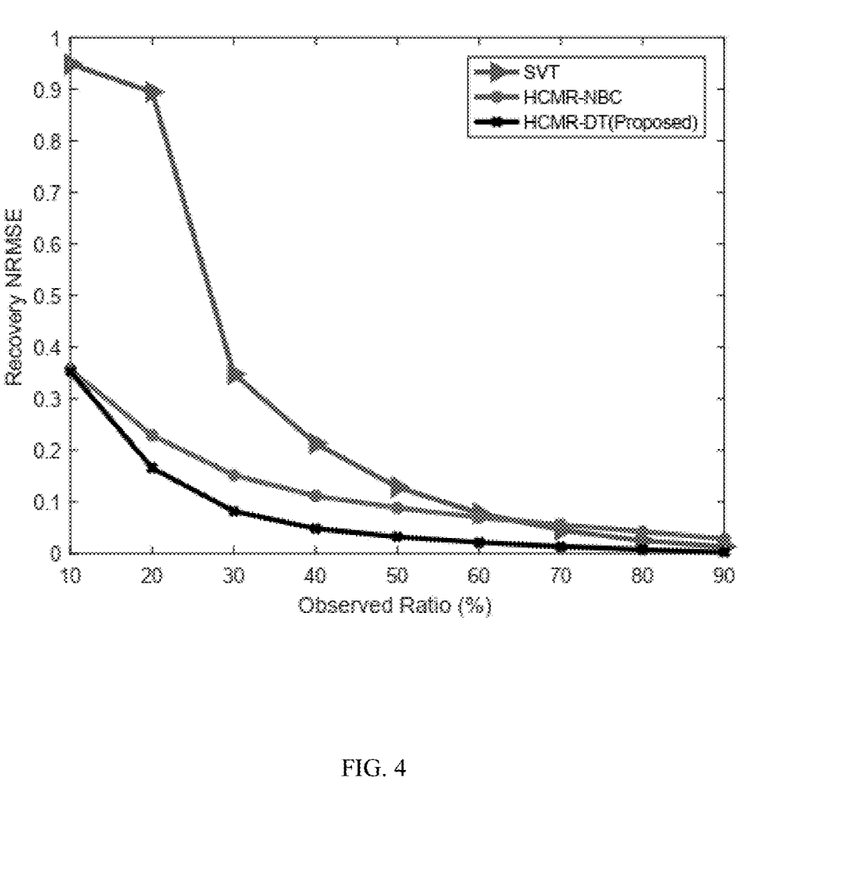
FIG. 4 shows reconstruction errors of the algorithm at different observation ratios according to Embodiment 1.

This embodiment also compares the effect of observation ratio on the reconstruction performance of the algorithm, and FIG. 4 shows the comparison of NRMSEs of the reconstruction of the algorithm at different observation ratios. It can be seen from the experimental results that the change of the observation ratio does not affect the performance advantage of the present disclosure.

Figure 5:
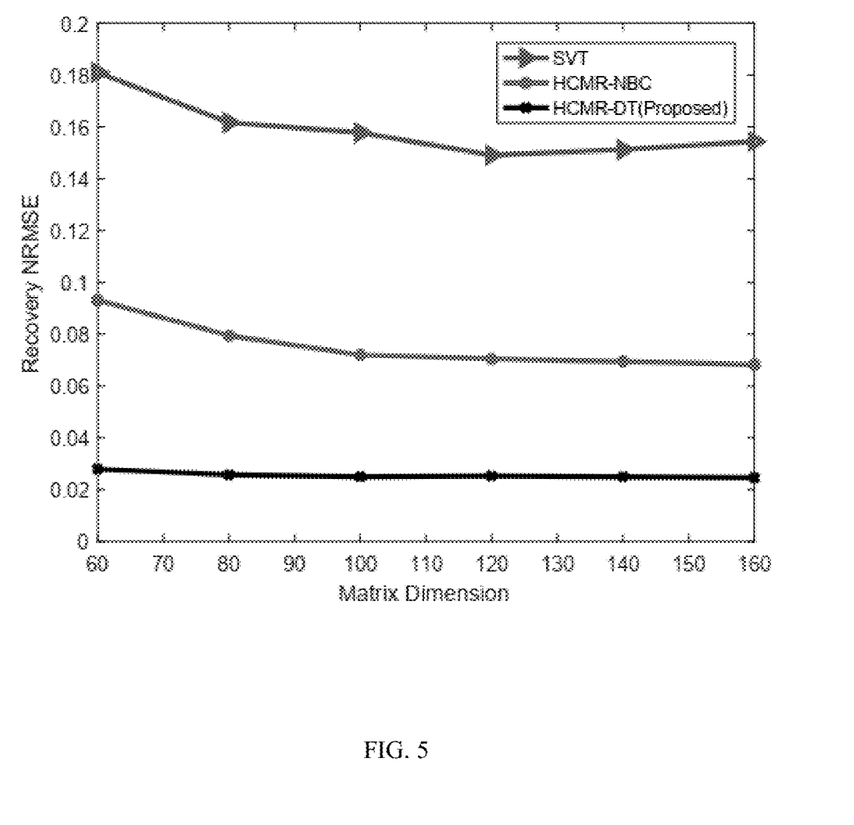
FIG. 5 shows matrix reconstruction errors at different matrix dimensions in an S-type network in Embodiment 1.
Figure 6:
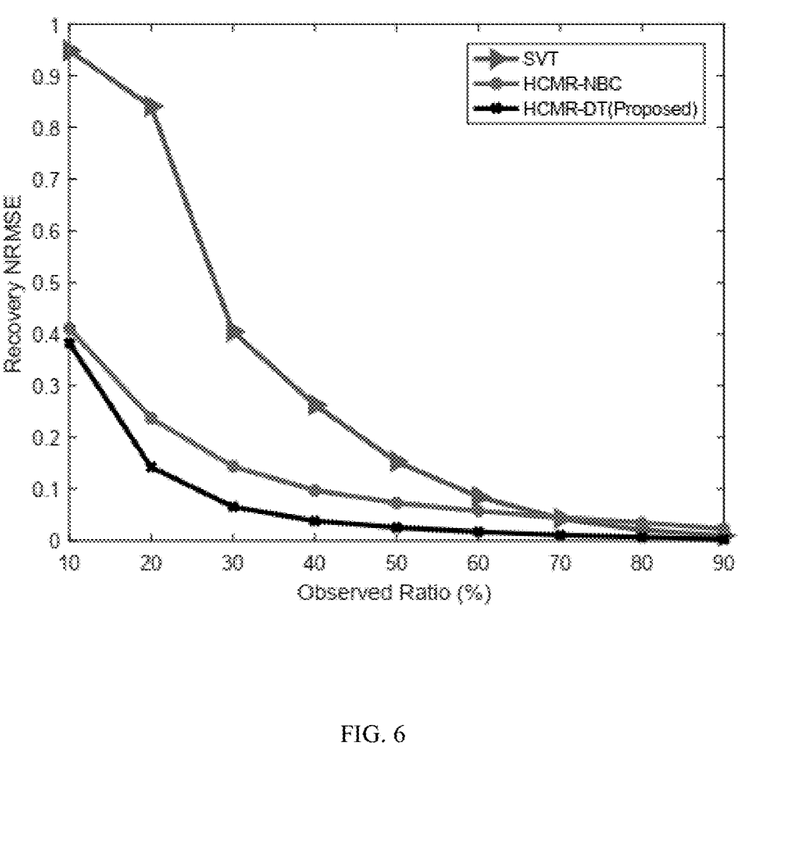
FIG. 6 shows matrix reconstruction errors at different observation ratios in the S-type network in Embodiment 1.
Figure 7:
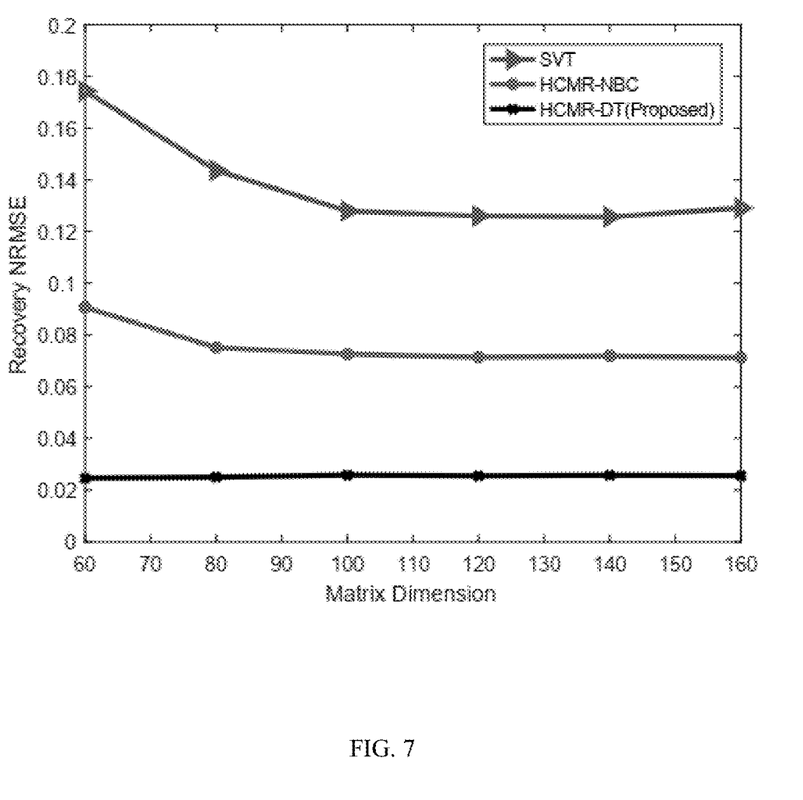
FIG. 7 shows matrix reconstruction errors at different matrix dimensions in an O-type network in Embodiment 1.
Figure 8:
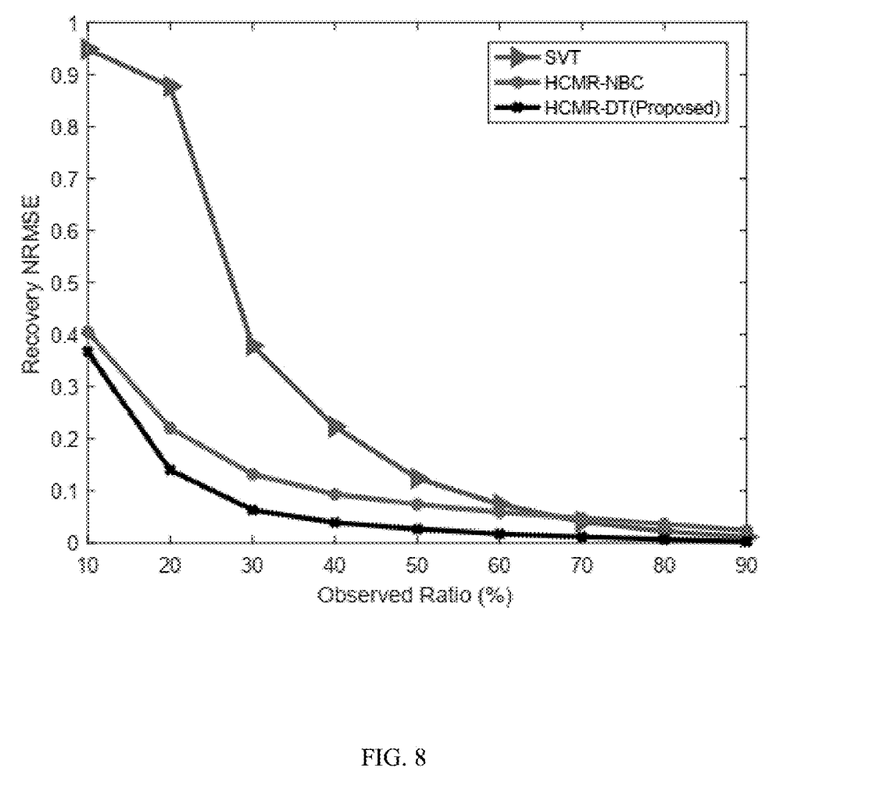
FIG. 8 shows matrix reconstruction errors at different observation ratios in the O-type network in Embodiment 1.

In addition, the adaptability of the method described in this embodiment for different networks is also proved. Comparison was performed carried out on topological networks with uniform node distribution, S-type node distribution and O-type node distribution. FIG. 3 and FIG. 4 show performance curves in the uniform network, FIG. 5 and FIG. 6 show reconstruction performance errors of the algorithm in the S-type network, and FIG. 7 and FIG. 8 show reconstruction performance errors of the algorithm in the O-type network. From the experimental results, it can be seen that the proposed method is highly adaptive to complex scenarios and shows good performance regardless of the network topology.

The hop count matrix recovered by using the method proposed in this embodiment has a wide range of applications in the field of IoT. In order to verify the significance of hop count recovery for IoT applications, the effectiveness of hop count matrix recovery is verified here with localization as a practical scenario. The classical DV-hop algorithm is used as a localization algorithm. Hop count matrices recovered by using the solution of this embodiment and other two contrast solutions, and the hop count matrix without missing entries are used for localization at the same time, and an average localization error of unknown nodes is evaluated using the NRMSE of localization, which is calculated as shown in equation (8):

$$NRMSE = \frac{\sum_{k=1}^{N_u}\sqrt{(\hat{x}_k - x_k)^2 + (\hat{y}_k - y_k)^2}}{N_u \times R} \quad (8)$$

wherein $(\hat{x}_k, \hat{y}_k)$ represents an estimated position of an unknown node k, $(x_k, y_k)$ represents a real position of the unknown node k. $N_u$ represents the number of unknown nodes, and R is the communication radius of each node.

Figure 9:
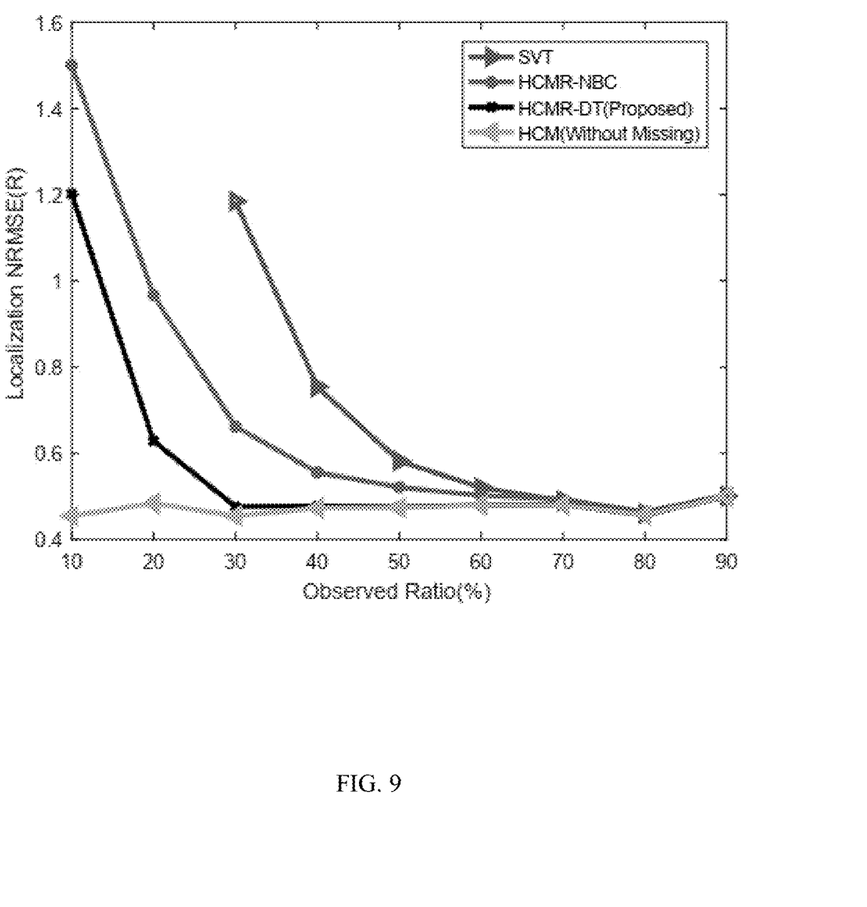
FIG. 9 shows localization errors of a recovered hop count matrix at different observation ratios according to Embodiment 1.
Figure 10:
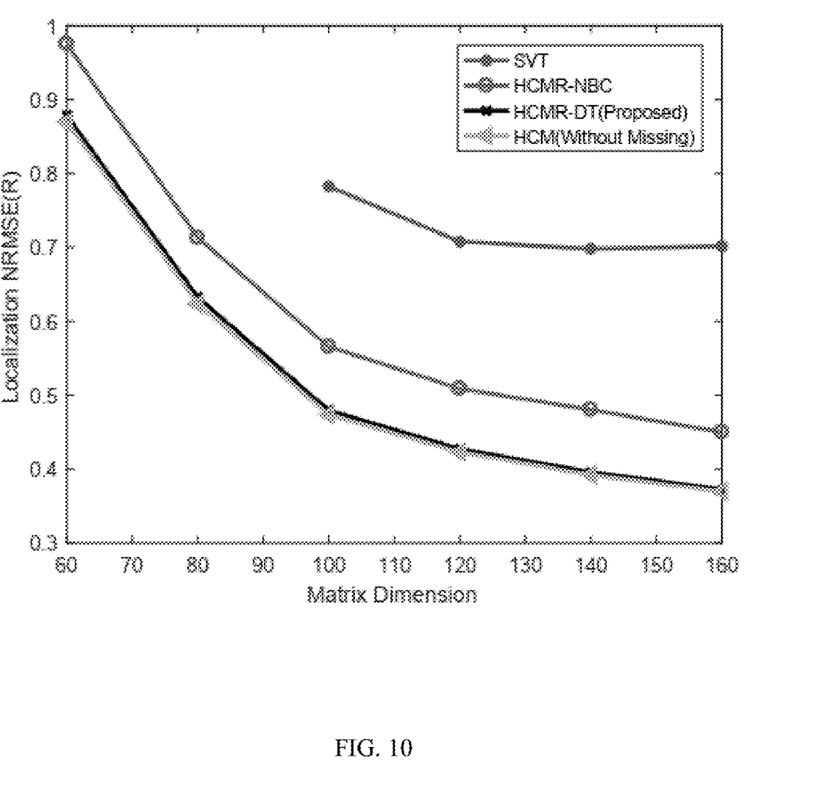
FIG. 10 shows localization errors of a recovered hop count matrix at different matrix dimensions according to Embodiment 1 (where an observation ratio is 30%).

FIG. 9 shows localization errors of a recovered hop count matrix at different observation ratios, with the matrix dimensions being set to 100×100.

It can be seen that the proposed method in this embodiment maintains the best localization performance all the time. In addition, the differences of location performance of the recovered hop count matrix at different matrix dimensions with an observation ratio of 40%. With reference to FIG. 9, it can be seen that the recovered hop count matrix can achieve the same localization effect as the hop count matrix without missing values at matrix observation ratios higher than 40%, and at higher matrix dimensions, the proposed method in this embodiment can achieve the same localization performance as the hop count matrix without missing entries at an observation ratio of 30%. This is a performance advantage unachievable by other matrix recovery solutions. Moreover, compared with other solutions, the localization performance of the method proposed in this embodiment is also greatly improved at lower matrix observation ratios Embodiment 2

A computer device is provided, including a memory, a processor, and a computer program stored in the memory and executable on the processor, where the processor implements the following method steps when executing the computer program:
S1: Perform a flooding process to acquire a hop count matrix $\tilde{H}$ with missing entries.
S2: Construct a training sample set according to relationships between a part of observed hop counts in the hop count matrix $\tilde{H}$, and model the observed hop counts in the hop count matrix as labels of the training sample set, where a maximum hop count represents the number of classes.
S3: Train a decision tree classifier according to the training sample set obtained in step S2.
S4: Construct features for unobserved hop counts, to obtain unknown samples.
S5: Input the unknown samples to the trained decision tree classifier, to obtain classes of the unknown samples, that is, obtain missing hop counts at corresponding positions in the matrix, to recover a complete hop count matrix H.

Embodiment 3

A computer readable storage medium storing a computer program is provided, where the following method steps are implemented when the computer program is executed by a processor:
S1: Perform a flooding process to acquire a hop count matrix $\tilde{H}$ with missing entries.
S2: Construct a training sample set according to relationships between a part of observed hop counts in the hop count matrix $\tilde{H}$, and model the observed hop counts in the hop count matrix as labels of the training sample set, where a maximum hop count represents the number of classes.
S3: Train a decision tree classifier according to the training sample set obtained in step S2.
S4: Construct features for unobserved hop counts, to obtain unknown samples.
S5: Input the unknown samples to the trained decision tree classifier, to obtain classes of the unknown samples, that is, obtain missing hop counts at corresponding positions in the matrix, to recover a complete hop count matrix H.

It is apparent that the above embodiments are merely intended to describe the present disclosure clearly, rather than to limit the implementations of the present disclosure. Any modification, equivalent substitution and improvement made within the spirit and principle of the present disclosure should fall within the protection scope of the claims of the present disclosure.

What is claimed is:
1. A method of hop count matrix recovery based on a decision tree classifier, comprising the following steps:
   S1: performing a flooding process to acquire a hop count matrix $\tilde{H}$ with missing entries;
   S2: constructing a training sample set according to relationships between a part of observed hop counts in the hop count matrix $\tilde{H}$, and modeling the observed hop counts in the hop count matrix as labels of the training sample set, wherein a maximum hop count represents a number of classes;
   S3: training a decision tree classifier according to the training sample set obtained in step S2; and
   S4: constructing a feature for an unobserved hop count, to obtain an unknown sample; and inputting the unknown sample to the trained decision tree classifier, to obtain a class of the unknown sample which equals to a missing hop count at a corresponding position in the hop count matrix, so as to recover a complete hop count matrix H;
   wherein step S2 specifically comprises:
   S201: traversing the hop count matrix $\tilde{H}$, and performing a next step if a hop count at a certain position is observed; otherwise, traversing a next value in the hop count matrix $\tilde{H}$;
   S202: using node i and node j to represent two nodes between which a hop count is missing, and with respect to all other nodes k, k=1, 2, . . . , n in a network, calculating a minimum hop count sum of a hop count $\tilde{h}_{ik}$ from node i to node k and a hop count $\tilde{h}_{kj}$ from node k to node j, as a first feature of a training sample;
   S203: calculating an average value of hop counts from neighboring nodes of node i to node j and hop counts from neighboring nodes of node j to node i, as a second feature of the training sample;
   S204: using the observed hop count as a class, forming the training sample by using the class together with the first feature and second feature, and adding the training sample to the training sample set; and
   S205: traversing the entire hop count matrix $\tilde{H}$, and obtaining the training sample set after the traversing is finished;
   wherein after step S1 and before step S2, if a symmetric position of a missing hop count is observed, the missing hop count is supplemented by using a hop count at the symmetric position;

the hop count at the symmetric position is determined by Normalized root mean square error (NRMSE), which is calculated as follows:

$$NRMSE = \frac{\sum_{k=1}^{N_u}\sqrt{(\hat{x}_k - x_k)^2 + (\hat{y}_k - y_k)^2}}{N_u \times R}$$

wherein $(\hat{x}_k, \hat{y}_k)$ represents an estimated position of an unknown node k, $(x_k, y_k)$ represents a real position of the unknown node k, $N_u$ represents the number of unknown nodes, and R is the communication radius of each node.

2. The method according to claim 1, wherein a hop count vector of any node i is constructed: $h_i=\{h_{i1}, h_{i2}, \ldots, h_{in}\}$, $h_{ij}$ represents a hop count between node i and node j, $i=1, \ldots, n; j=1, \ldots, n$; and the hop count matrix $\tilde{H}$ with missing entries is represented as follows:

$$\tilde{H} = H \odot \Omega = \begin{bmatrix} 0 & h_{12} \times \omega_{12} & h_{13} \times \omega_{13} & \ldots & h_{1n} \times \omega_{1n} \\ h_{21} \times \omega_{21} & 0 & h_{23}\omega_{23} & \ldots & h_{2n} \times \omega_{2n} \\ h_{31} \times \omega_{31} & h_{32} \times \omega_{32} & 0 & \ldots & h_{3n} \times \omega_{3n} \\ \vdots & \vdots & \vdots & \ddots & \vdots \\ h_{n1} \times \omega_{n1} & h_{n2} \times \omega_{n2} & h_{n3} \times \omega_{n3} & \ldots & 0 \end{bmatrix} =$$

$$\begin{bmatrix} 0 & \tilde{h}_{12} & \tilde{h}_{13} & \ldots & \tilde{h}_{1n} \\ \tilde{h}_{21} & 0 & \tilde{h}_{23} & \ldots & \tilde{h}_{2n} \\ \tilde{h}_{31} & \tilde{h}_{32} & 0 & \ldots & \tilde{h}_{3n} \\ \vdots & \vdots & \vdots & \ddots & \vdots \\ \tilde{h}_{n1} & \tilde{h}_{n2} & \tilde{h}_{n3} & \ldots & 0 \end{bmatrix},$$

wherein $\odot$ represents a Hadamard product; $\Omega=[\omega_{ij}]_{n*n}$ is a binary matrix; $\omega_{ij}$ indicates whether a hop count at a corresponding position of the hop count matrix is missing, and is expressed as follows:

$$\omega_{ij} = \begin{cases} 1, & \text{if hop count } h_{ij} \text{ is observed} \\ 0, & \text{others cases} \end{cases}.$$

3. The method according to claim 1, wherein step S203 specifically comprises: initializing two neighbor lists $L_i$ and $L_j$, selecting neighbors of node i according to a hop count vector $\tilde{h}_i$, and selecting neighbors of node j according to a hop count vector $\tilde{h}_j$; storing indexes of neighboring nodes of node i and indexes of neighboring nodes of node j in the corresponding neighbor lists $L_i$ and $L_j$ respectively, wherein a variable $n_i$ represents a number of available neighboring nodes of node i, and a variable $n_j$ represents a number of available neighboring nodes of node j; and if a hop count $\tilde{h}_{L_i(k)j}$ between a neighboring node $L_i(k)$ and node j is observed, incrementing the number of available neighboring nodes $n_i$ by 1;

wherein the second feature of the training sample is calculated as follows:

$$f^2 = \frac{\sum_{k=1, \tilde{h}_{jL_i(k)} \neq 0}^{n_i} \tilde{h}_{jL_i(k)} + \sum_{k=1, \tilde{h}_{iL_j(k)} \neq 0}^{n_j} \tilde{h}_{iL_j(k)}}{n_i + n_j}$$

wherein $f^2$ represents a second feature of the training sample.

4. The method according to claim 3, wherein the constructed training sample set is expressed as follows:

$S=[s_1, s_2, \ldots, s_N]=[(f_1^1, f_1^2, c_1); (f_2^1, f_2^2, c_2); \ldots (f_N^1, f_N^2, c_N)]$, wherein $f_m^1$ represents a first feature of an $m^{th}$ training sample, $f_m^2$ represents a second feature of the $m_{th}$ training sample, and $c_m \in \{1, 2, \ldots, h_{max}\}$ represents a class of the $m^{th}$ training sample, $m=1, 2, \ldots, N$, and $h_{max}$ is a maximum hop count.

5. The method according to claim 4, wherein step S4 specifically comprises:

S401: if the hop count at a certain position in the hop count matrix $\tilde{H}$ is not observed, performing a next step; otherwise, traversing a next value in the hop count matrix $\tilde{H}$;

S402: using node i and node j to represent two nodes between which a hop count is missing, and with respect to all other nodes k, $k=1, 2, \ldots, n$ in the network, calculating a minimum hop count sum of a hop count $\tilde{h}_{ik}$ from node i to node k and a hop count $\tilde{h}_{kj}$ from node k to node j, as a first feature of the unknown sample;

S403: calculating an average value of hop counts from neighboring nodes of node i to node j and hop counts from neighboring nodes of node j to node i, as a second feature of the unknown sample;

S404: forming the unknown sample by using the constructed first feature and second feature of the unknown sample, inputting the unknown sample to the trained decision tree classifier to obtain the class of the unknown sample, that is, obtain the hop count at the position; and S405: if traversing of the hop count matrix $\tilde{H}$ is not finished, traversing a next value in the matrix and returning to step S401; and if traversing of the hop count matrix $\tilde{H}$ is finished, obtaining the recovered hop count matrix.

6. The method according to claim 5, wherein the constructed unknown sample is expressed as follows:

$$\left( \min(\tilde{h}_{ik} + \tilde{h}_{kj}), \frac{\sum_{k=1, \tilde{h}_{jL_i(k)} \neq 0}^{n_i} \tilde{h}_{jL_i(k)} + \sum_{k=1, \tilde{h}_{iL_j(k)} \neq 0}^{n_j} \tilde{h}_{iL_j(k)}}{n_i + n_j} \right),$$

in $\min(\tilde{h}_{ik}+\tilde{h}_{kj})$ represents a minimum sum of a hop count $\tilde{h}_{ik}$ from node i to node k and a hop count $\tilde{h}_{kj}$ from node k to node j.

7. A computer system, comprising a memory, a processor, and a computer program stored in the memory and executable on the processor, wherein the processor implements the steps of the method according to claim 1 when executing the computer program.

* * * * *